US012020219B1

(12) United States Patent
Bellur

(10) Patent No.: US 12,020,219 B1
(45) Date of Patent: Jun. 25, 2024

(54) SYSTEM AND METHOD FOR CLASSIFICATION AND MANAGEMENT OF HAZARDOUS WASTE STREAMS

(71) Applicant: Ravi Bellur, Norwell, MA (US)

(72) Inventor: Ravi Bellur, Norwell, MA (US)

(73) Assignee: Ravi Bellur, Norwell, MA (US)

(*) Notice: Subject to any disclaimer, the term of this patent is extended or adjusted under 35 U.S.C. 154(b) by 203 days.

(21) Appl. No.: 17/834,330

(22) Filed: Jun. 7, 2022

Related U.S. Application Data

(60) Provisional application No. 63/208,077, filed on Jun. 8, 2021.

(51) Int. Cl.
| | |
|---|---|
| *G06Q 10/30* | (2023.01) |
| *G06F 18/24* | (2023.01) |
| *G06Q 10/047* | (2023.01) |
| *G06Q 10/0631* | (2023.01) |

(52) U.S. Cl.
CPC ............ *G06Q 10/30* (2013.01); *G06F 18/24* (2023.01); *G06Q 10/047* (2013.01); *G06Q 10/0631* (2013.01)

(58) Field of Classification Search
None
See application file for complete search history.

(56) References Cited

U.S. PATENT DOCUMENTS

| | | | | |
|---|---|---|---|---|
| 7,965,172 B2 * | 6/2011 | Angell | ...................... | B09B 3/00 340/505 |
| 2002/0138197 A1 * | 9/2002 | Schramke | ............ | G06Q 10/047 701/469 |
| 2007/0010701 A1 * | 1/2007 | Forrester | ................... | B09B 3/21 588/256 |
| 2007/0225991 A1 * | 9/2007 | Hollingsworth | ....... | G06Q 10/30 705/308 |
| 2007/0278140 A1 * | 12/2007 | Mallett | ..................... | B07C 5/34 705/308 |
| 2008/0061977 A1 * | 3/2008 | Maruca | ............. | G06Q 10/0637 340/572.1 |
| 2011/0130945 A1 * | 6/2011 | Deedy | .................... | G08G 1/207 701/112 |
| 2011/0316689 A1 * | 12/2011 | Reyes | .................. | B65F 1/1484 340/532 |

(Continued)

FOREIGN PATENT DOCUMENTS

| | | | | |
|---|---|---|---|---|
| WO | WO-02082344 A1 * | 10/2002 | ............. | G06Q 10/06 |
| WO | WO-2021020790 A1 * | 2/2021 | ............... | B08B 3/02 |
| WO | WO-2021207202 A1 * | 10/2021 | ........... | B65G 67/603 |

*Primary Examiner* — Luis A Brown
(74) *Attorney, Agent, or Firm* — Davis, Malm & D'Agostine, P.C.; Richard L. Sampson

(57) ABSTRACT

A system and method for automatically classifying and managing the transport of hazardous waste: captures from an ecommerce platform, waste management requests, waste profile data, and waste pickup locations; enters the waste profile data into an AI data processor; causes the AI data processor to use the waste profile data to generate a predicted waste class code (WCC); uses the WCC to generate land disposal restrictions (LDRs), to generate an optimal location for analysis and/or disposal, and to send operational directives to a collection and transportation device (CTD) for collecting and transporting the waste for analysis; and uses a property analyzer to generate an analysis of the waste to confirm compliance with the WCC.

22 Claims, 8 Drawing Sheets

(56) References Cited

U.S. PATENT DOCUMENTS

| | | | |
|---|---|---|---|
| 2018/0075417 A1* | 3/2018 | Gordon | B64D 1/22 |
| 2018/0268379 A1* | 9/2018 | Collins | G06Q 10/0838 |
| 2019/0131013 A1* | 5/2019 | Kelkar | G16H 40/20 |
| 2019/0220829 A1* | 7/2019 | Ripley | G06Q 10/30 |
| 2020/0114394 A1* | 4/2020 | Ripley | B07C 5/3416 |
| 2020/0372457 A1* | 11/2020 | Ripley | G06Q 10/0833 |
| 2020/0372557 A1* | 11/2020 | Peters | G06Q 10/30 |
| 2021/0114432 A1* | 4/2021 | Rodoni | B60W 50/14 |
| 2021/0174150 A1* | 6/2021 | Ripley | G06F 9/542 |
| 2021/0188541 A1* | 6/2021 | Kurani | B65F 1/14 |

* cited by examiner

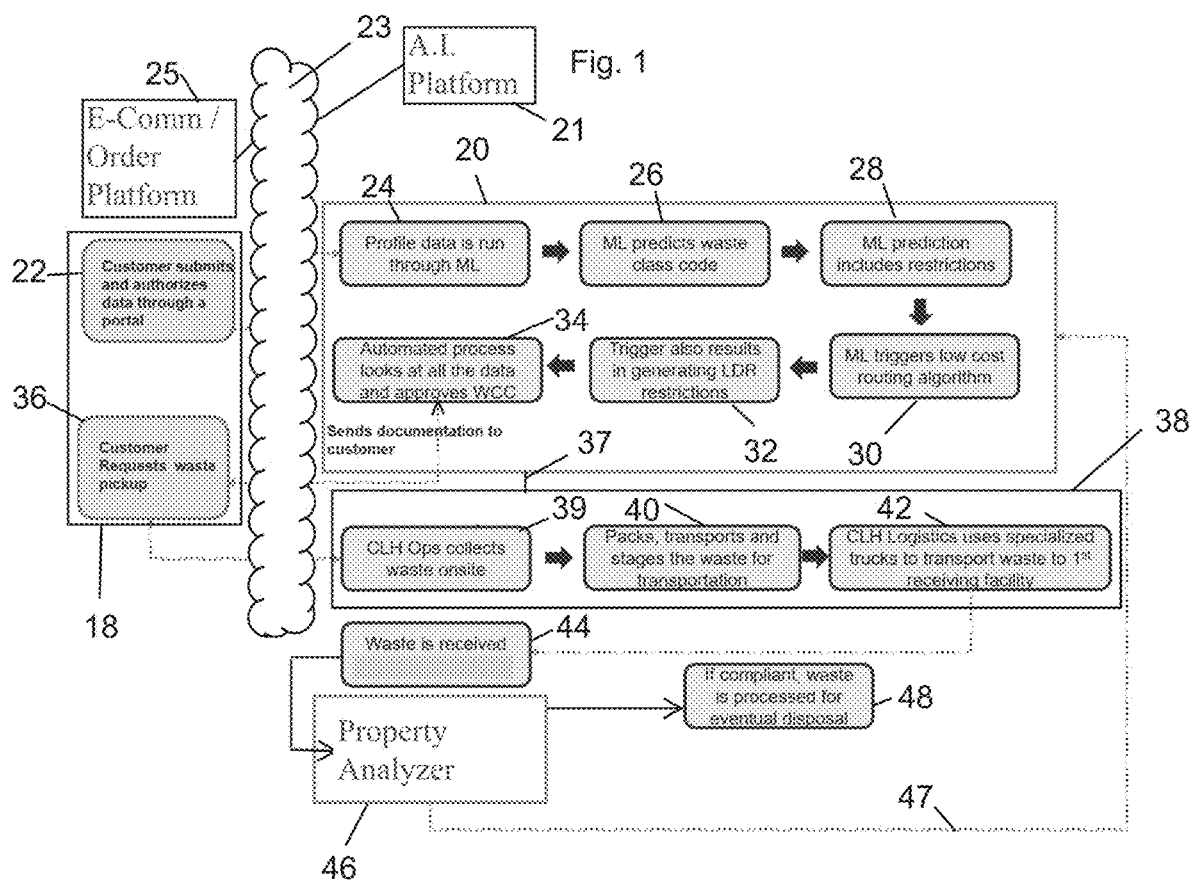

Appendix         Fig. 2

Section 1 - Waste class codes descriptions

Top Waste Class Code and Part number

| WCC | Description | Waste Specifications | Part SS2# | SK Description |
|---|---|---|---|---|
| A22X | Low Btu Organic Liquid | pH 2-14, no DD02 Acids allowed<br>Ammonia less than 10 percent<br>Source of PCB <50 ppm<br>Heating value less than 5000 BTUs per pound<br>Less than 5 percent organic halogens<br>Less than 1 percent Sulfur<br>Viscosity less than 150 centipoise<br>Must not set-up in water or with organic solvents<br>Less than one inch of solids in the drum<br>No pesticides | 875320 | INCINERATE AQ LIQ LOW CHL <5X |
| A32V | Specification Oil & Water BULK | | Bulk Service | |
| A40 | Organic Liquid With Halogens | Less than one inch of solids in the drum<br>Source of PCB <50 ppm<br>Organic halogen greater than 5 percent<br>Sulfur greater than 5 percent<br>pH between 2-13<br>Must not set-up in water or solvents<br>Over 5,000 BTU per pound | 870730 | ORGANIC LIQ W/HALOGEN |
| A980B | High Hazard Liquids For Direct Feed Incineration | Potentially high hazard material<br>Requires special handling<br>Specifications determined for each profile | 875290 | INCINERATE REACTV ORGANIC LIQ |
| B22A | Concentrated Acids | pH Less than 7<br>Less than 5 percent T.O.C. (Total Organic Carbon)<br>Less than 1 inch solids in drum<br>Less than 1 percent ammonia<br>Less than 1 inch oil and grease<br>Less than 10 ppm hex chrome<br>Flashpoint greater than 140 degrees F<br>No cyanides<br>No sulfides<br>No chelators<br>No pesticides<br>Neutralization Equivalent greater than 20 (approx. >20% acid) | 876350 | WWAC GENERAL ACIDS <30% CONC |
| B22B | Concentrated Bases | pH greater than or equal to 7<br>Less than 5 percent T.O.C. (Total Organic Carbon)<br>Flashpoint greater than 140 degrees F<br>Neutralization equivalent greater than 20 (approx. >30% base)<br>No cyanides / sulfides<br>No chelators<br>No pesticides<br>Less than 10 ppm hexchrome<br>Less than 1 inch solids in drum<br>Less than 1 percent ammonia<br>Less than 1 inch oil and grease<br>PRIMARY DISPOSAL METHOD: Wastewater Treatment | 879800 | CONCENTRATE D BASES |
| B26A | Acidic Wastewater With Low Metals | pH 1-6<br>Neutralization equivalent less than 5 (approx. <10% acid)<br>Flashpoint greater than 140 degrees F<br>Cyanide / sulfide non-detectable<br>No pesticides<br>Less than 1 percent T.O.C. (Total Organic Carbon)<br>Less than 10ppm hexchrome<br>Less than 1 inch solids in drum<br>Less than 1 percent ammonia<br>Less than 50ppm total metals | 879860 | ACIDC WW-LOW METALS |

Section #2 – Example of how each WCC is disposed

All Waste Class Codes Waste Specifications and SK Lead Part Number

| Likely Dispo Method | Waste Class Code | Description | Waste Specifications | SK Lead Part # | Treatment Type | Waste Product line |
|---|---|---|---|---|---|---|
| SOLVENT RECOVERY | A17 | NON HALOGENATED SOLVENTS | Non halogenated solvents<br>Specification and purity as per profile/sample<br>recycling parameters individually assigned | 875918 | RECL | RECL |
| | A22K | LOW BTU ORGANIC LIQUID | pH 2-14, no D002 Acids allowed<br>Ammonia less than 10 percent<br>Source of PCB <50 ppm<br>Heating value less than 5000 BTUs per pound<br>Less than 5 percent organic halogens<br>Less than 1 percent Sulfur<br>Viscosity less than 150 centipoise<br>Must not set-up in water or with organic solvents<br>Less than one inch of solids in the drum<br>No pesticides | 875228 | INC | HINC |
| | A23 | BILAYERED SOLVENT/WATER | Non-detectable PCBs<br>Less than 5 percent organic halogen/sulfur<br>pH between 2-12<br>Waste codes and treatability acceptable for CES<br>Less than one inch solids in drum<br>No pesticides, biocides, or cyanides<br>No chelating agents, surfactants, or emulsifiers<br>Up to 100ppm phenol<br>Must not set-up with water or with organic solvents | 876328 | FSLE | CES |
| | A23 | BILAYERED SOLVENT/WATER | Less than 5 ppm PCB's, not TSCA regulated<br>Less than 3% organic halogen/sulfur<br>pH between 2-12<br>EPA waste codes D001, D004-D011, D018-D043<br>Less than one inch solids in drum<br>No pesticides | 876328 | WWT | CES |
| CLEAN EXTRACTION SYSTEM | A24 | CES LIQUID | Less than 300,000 ppm total organic carbon<br>Source of PCB <50 ppm<br>No biocides, pesticides, or cyanide<br>No chelating agents, surfactants, or emulsifiers<br>Up to 100 ppm phenol<br>Must not set up in water or organic solvents<br>pH 2-12<br>Waste codes and treatability acceptable for CES process<br>Specific gravity less than 1.2<br>Less than one inch of solids in drum | 870728 | CFE | CES |

Fig 2.1 represents the core physical data properties that are captured for a typical waste profile.

| Attribute | WWN | WWN Table Name | WWN Field Name | Sub category |
|---|---|---|---|---|
| Process Generating Waste | What is the process generating the waste? | actv_prof | waste_generation_process_descr | Description |
| In small containers? | Is this waste contained in small packaging contained within a larger shipping container? | actv_prof_ext | labpack_waste_indcr | Description |
| Physical State Code | Physical State Code Value | actv_prof | physical_state | Properties |
| BTU Code | BTU/LB (BAU/kg) | actv_prof | btus | Properties |
| Min BTU Text Box | Min BTU Value | actv_prof | btus_value | Properties |
| Max BTU Text Box | Max BTU Value | actv_prof | btus_value_max | Properties |
| Total Organic Carbon | Total Organic Carbon (%) | actv_prof | total_organic_carbon | Properties |
| pH Code | pH | actv_prof | ph | Properties |
| Min pH Text Box | pH - Min | actv_prof | ph_value | Properties |
| Max pH Text Box | pH - Max | actv_prof | ph_value_max | Properties |
| Boiling Point Code | Boiling Point | actv_prof | boiling_point | Properties |
| Flash Point Code | Flash Point (°F/°C) | actv_prof | flash_point | Properties |
| Min Flash Point Text Box | Flash Point (°F/°C) - Min | actv_prof | flash_point_value | Properties |
| Max Flash Point Text Box | Flash Point (°F/°C) - Max | actv_prof | flash_point_value_max | Properties |
| Viscosity Code | Viscosity (Centipoise) | actv_prof | viscosity | Properties |
| Min % Free Liquid | % Free Liquid - Min | actv_prof | min_free_liquid | Properties |
| Max % Free Liquid | %Free Liquid - Max | actv_prof | max_free_liquid | Properties |
| Min % Settled Solid | %Settled Solid - Min | actv_prof | min_settled_solid | Properties |
| Max % Settled Solid | %Settled Solid - Max | actv_prof | max_settled_solid | Properties |
| Min % Total Suspended Solid | %Total Suspended Solid Min | actv_prof | min_suspended_solid | Properties |
| Max % Total Suspended Solid | %Total Suspended Solid Max | actv_prof | max_suspended_solid | Properties |

Fig 2.2 represent another set of data properties for a waste profile – this time of the key chemical constituents of a waste profile.

Fig. 5

| Attribute | WWN | WWN Table Name | WWN Field Name | Sub category |
|---|---|---|---|---|
| Chemical Composition: Chemical Name | Chemicals: Chemical | prof_chmcl | chmcl_name | Composition |
| Chemical Composition: Max | Chemicals: Max | prof_chmcl | constit_perct_max | Composition |
| Chemical Composition: Min | Chemicals: Min | prof_chmcl | constit_perct_minmm | Composition |
| Chemical Composition: UOM | Chemicals: UOM | prof_chmcl | constit_uom | Composition |
| US EPA hazardous waste? | Is this a US EPA hazardous waste? | actv_prof_ext | us_epa_hazardous_waste_indcr | Composition |
| EPA Waste Code | EPA Waste Code | prof_epa_cd | epa_wst_cd | Composition |

Random Forest Simplified

SYSTEM AND METHOD FOR CLASSIFICATION AND MANAGEMENT OF HAZARDOUS WASTE STREAMS

RELATED APPLICATION

This application claims the benefit of U.S. Provisional Patent Application Ser. No. 63/208,077, entitled Classification of Non-Hazardous and Hazardous Waste Streams, filed on Jun. 8, 2021, the contents of which are incorporated herein by reference in their entirety for all purposes.

BACKGROUND

Technical Field

This invention relates to waste management, and more particularly, to an apparatus and method for classifying and managing the transport of hazardous waste.

Background Information

Waste management organizations such as the instant applicant, receive many requests from customers each year for assistance in generating waste profiles identifying the contents of their waste materials, and for the collection and disposal of such materials. The information provided by a waste profile is typically used to enable waste management organizations to determine how best to collect, transport and dispose of a customer's waste materials. These waste materials may be regulated by the U.S. Environmental Protection Agency (EPA) and various state agencies. The EPA regulations are outlined in the U.S. Code of Federal Regulations (CFR) Chapter 40, and govern the collection, transportation and disposal of both non-hazardous and especially hazardous waste. These regulations are enforced in line with EPA's stated objective of protecting human health and the environment. Generators of any waste that has a chemical or biological origin in the United States must typically comply with these laws, as do the organizations/companies that transport and process these wastes. Together with the Department of Transportation (DoT), the EPA provides a comprehensive set of regulations that must be adhered to by companies processing chemical/biological waste. An aspect of complying with the foregoing is preparing an accurate profile of the waste, known as a waste class code (WCC). Conventional approaches for generating WCCs tend to be labor intensive, time consuming, and potentially inaccurate. A need exists for a system and method for automatically classifying and managing the transport of hazardous waste.

SUMMARY

The appended claims may serve as a summary of the invention. The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is illustrated by way of example and not limitation in the figures of the accompanying drawings, in which like references indicate similar elements and in which:

FIG. 1 is a block diagram illustrating one embodiment of the present invention;

FIG. 2 is a table illustrating aspects of the embodiment of FIG. 1;

FIG. 3 is another table illustrating aspects of the embodiment of FIG. 1;

FIG. 4 is yet another table illustrating aspects of the embodiment of FIG. 1;

FIG. 5 is still another table illustrating aspects of the embodiment of FIG. 1;

DETAILED DESCRIPTION

Figure 6:
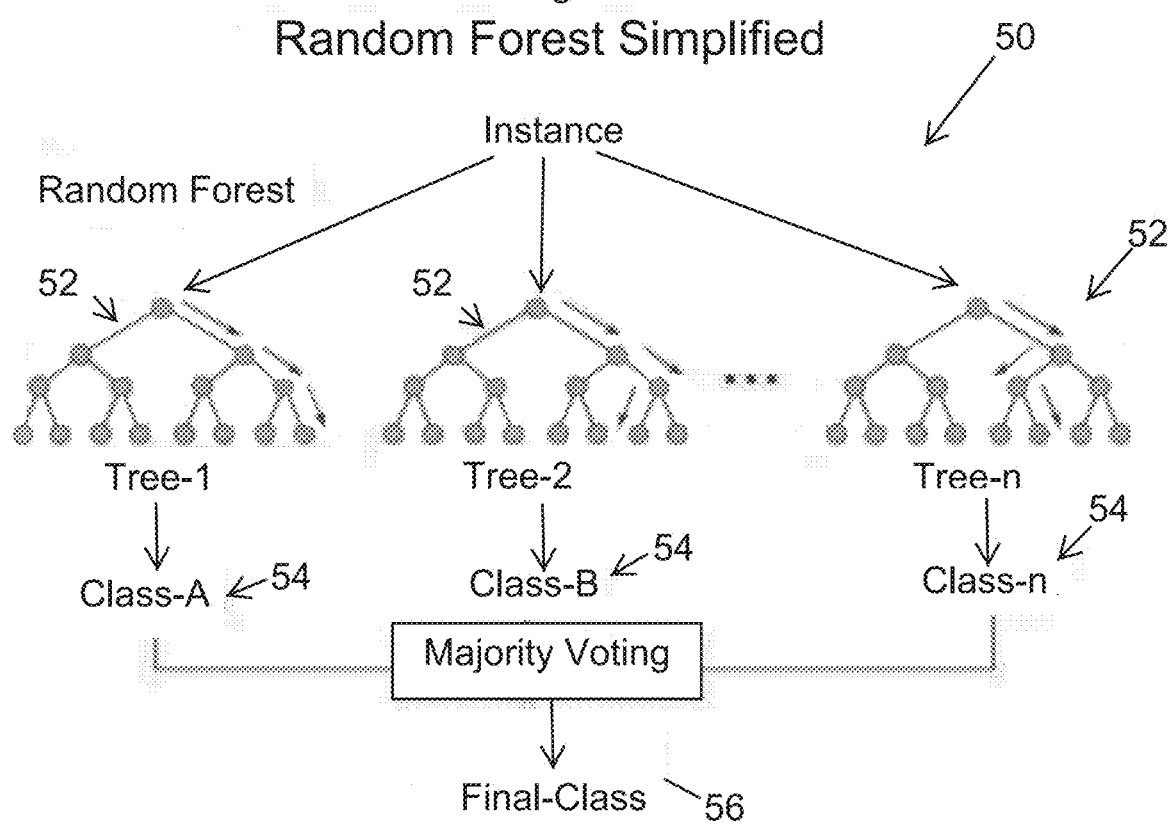
FIG. 6 is a generalized schematic diagram of aspects of the embodiments of FIGS. 1-5.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. In addition, well-known structures, circuits and techniques have not been shown in detail in order not to obscure the understanding of this description. The following detailed description is, therefore, not to be taken in a limiting sense, and the scope of the present invention is defined by the appended claims and their equivalents.

General Overview

This document describes embodiments of an apparatus including sophisticated measurement devices and specialized computers configured to leverage Artificial Intelligence to predict Waste Class Codes (WCCs) for various waste streams and to use the WCCs to effect waste collection and transportation. As used herein, Waste Class Codes refer to a categorization of various behaviors exhibited by certain categories of chemicals that are generated as part of an industrial or automotive process. Any generator of this type of waste needs to have this waste collected, packed, transported and disposed in compliance with federal and state laws. To do this effectively, the Applicant has instituted a process of waste stream onboarding, which includes, for example, (i) capturing data related to the output of a waste generator's processes, (ii) analyzing these data, (iii) classifying and categorizing the behaviors of the waste stream based on various environmental conditions, and (iv) approving such waste for pickup and disposal. Such waste streams each have their own "waste profile".

The instant Applicant is the leading provider of environmental services for North American companies engaged in various industries and trade. As such, the Applicant currently handles hundreds of thousands waste profiles each year from thousands of customers and each waste profile may be generated by customers multiple times each year. With rapid advances in technology and increasing efficiencies of industrial process, the market is generating more variety of waste profiles with newer chemical substances being introduced into the market each year. Applicant has recognized that Artificial Intelligence (A.I.) systems may be trained on the taxonomy of existing chemical substances and the complex behaviors exhibited by these substances when multiple types of chemicals are mixed with each other in industrial processes, which unless correctly and accurately recognized, may pose dangers and risks to people and equipment processing the waste output. Embodiments of the present invention use A.I to look at vast volumes of past historical data to gauge and predict future behaviors of various combinations of chemicals to improve safety for those handling these chemicals as well as potentially reducing cost by improving efficiency relative to conventional approaches.

Embodiments of the present invention help enable personnel involved in hazardous waste processing to classify the materials they encounter at job sites in real time using machine learning provides the ability to collect and transport these materials in a quick and efficient manner, reduce downstream accidents, reduce errors in compliance reporting, and lab testing.

Terminology

As used in the specification and in the appended claims, the singular forms "a", "an", and "the" include plural referents unless the context clearly indicates otherwise. For example, reference to "an analyzer" includes a plurality of such analyzers. In another example, reference to "an analysis" includes a plurality of such analyses.

Although specific terms are employed herein, they are used in a generic and descriptive sense only and not for purposes of limitation. All terms, including technical and scientific terms, as used herein, have the same meaning as commonly understood by one of ordinary skill in the art to which this invention belongs unless a term has been otherwise defined. It will be further understood that terms, such as those defined in commonly used dictionaries, should be interpreted as having a meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure. Such commonly used terms will not be interpreted in an idealized or overly formal sense unless the disclosure herein expressly so defines otherwise.

Where used in this disclosure, the terms A.I., Augmented Intelligence, Machine Learning and Deep Learning are used interchangeably to refer to the use of Artificial Intelligence technology. As used herein, the terms "computer", "client computer" and "end-user device" are meant to encompass a workstation, personal computer, tablet, wireless telephone, or any other suitable computing device including a processor, a computer readable medium upon which computer readable program code (including instructions and/or data) may be disposed, and a user interface. Terms such as "server", "application", "engine", "component", "module", and the like are intended to refer to a computer-related entity, including hardware or a combination of hardware and, software. For example, an engine may be, but is not limited to being: a process running on a processor; a processor including an object, an executable, a thread of execution, and/or program; and a computer. Moreover, the various computer-related entities may be localized on one computer and/or distributed between two or more computers. The term "real time" refers to sensing and responding to external events nearly simultaneously (e.g., within milliseconds or microseconds) with their occurrence, or without intentional delay, given the processing limitations of the system and the time required to accurately respond to the inputs.

Programming Languages

The system and method embodying the present invention can be programmed in any suitable language and technology, such as, but not limited to: Assembly Languages, C, C++; Visual Basic; Java; VBScript; Jscript; Node.js; BCMAscript; DHTM1; XML and CGI. Alternative versions may be developed using other programming languages including, Hypertext Markup Language (HTML), Active ServerPages (ASP) and Javascript. Any suitable database technology can be employed, such as, but not limited to, Microsoft SQL Server or IBM AS 400, as well as big data and NoSQL technologies, such as, but not limited to, Hadoop or Microsoft Azure.

Turning now to Figures, embodiments of the present invention will be more thoroughly described.

Referring to FIG. 1, a representative automated apparatus and method for classifying and managing the transport of hazardous chemical waste in accordance with the present invention, is shown. This apparatus and method includes a classification and control system 20, which executes aspects of waste class code (WCC) prediction and approval using an artificial intelligence (A.I.) processor/platform 21, with data captured via a specialized order fulfillment/ecommerce platform (website) 25 and specialized property analyzer 46, and manages waste transport via a specialized hazardous waste collection and transportation device (CTD) 38 communicably coupled to system 20, e.g., by cellular and/or GPS (Global Positioning Satellite) networks to an on-board tablet computer or cell phone. In particular embodiments, the CTD is a vacuum truck and/or trailer configured to vacuum wet and/or dry hazardous waste into an on-board tank for transport to the waste receiving location. Examples of suitable CTDs are those owned, operated, and commercially available from Clean Harbors, Inc. (Norwell, MA).

This representative process begins with a customer accessing website/ecommerce platform 25 via a customer computer 18 to request a quote to dispose of waste materials and upload data pertaining to its generated waste at 22 to system 20, via network/internet 23. The information uploaded at 22 thus includes waste management requests, waste profile data, and waste pickup locations. System 20 captures the data at 24, and with its AI platform 21, either indicates via platform 25 that more data is required from the customer, or uses the data, including the chemical compositions of the waste provided by the customer, to predict waste class code(s) (WCCs) at 26. Any processing restrictions based on the chemical compositions are generated at 28 and included with the WCCs. System 20 then determines whether the waste can be treated at any of a plurality of predetermined destination facilities, and if so, executes a routing algorithm at 30 to determine an optimal one of the destination facilities based on the predicted WCCs. Any Land Disposal Restrictions (LDRs) based on the predicted WCCs are generated at 32. LDRs are protective measures be taken before any hazardous waste is disposed of on land.

Regarding steps 30 and 32, it should recognized that disposal involves identifying various attributes or properties of the waste steam that will not contaminate the environment as part of the disposal process. For example, two disposal options include incineration and landfills. When a substance is incinerated, the ash generated from the incineration also must be disposed—and any ash with active material may continue to contaminate the environment. For example, light bulbs containing mercury cannot be incinerated, and are instead treated with other disposal technologies. Likewise, certain materials are prohibited from being landfilled due to risks of eventual seepage into the surrounding ecosystem. The LDRs generated at 32 are configured to address these issues. Moreover, in particular embodiments, step 30 includes identification of an optimal one of a plurality of predetermined waste receiving locations for analysis and/or disposal of the waste, e.g., based on the contents of the waste (as set forth in the WCC) and/or disposal cost.

At 34, the system issues (e.g., preliminary) approval of the waste collection job and sends documentation including the WCC and LDRs to the customer via platform 25.

If the customer approves the documentation and wishes to proceed, the customer authorizes and requests waste pickup at 36 from customer computer 18 via platform 25. Upon receipt of the customer authorization, system 20 uses the WCC and the optimal one of a plurality of predetermined waste receiving locations, to generate and send at 37, operational directives to the CTD 38, e.g., to a tablet or cell phone on board CTD 38, for collecting and transporting at least a sample of the waste to the optimal waste receiving location for analysis. CTD 38 is then used to collect 39, pack 40, and transport 42 at least a sample of the waste to a receiving facility 44 where a specialized property analyzer 46 is used to test the waste for compliance with the documentation/WCC generated by system 20, and to generate an output corresponding to physical characteristics of the waste.

In particular embodiments, the property analyzer 46 includes a spectrometer configured to apply a molecular spectroscopy technique selected from a group consisting of: absorption of mid- or near-infrared electromagnetic radiation and include by way of non-limiting example FTIR, FTNIR, AOTF NIR, scanning dispersive NIR, diode-array NIR, MEMS-NIR (IR/NIR); Raman-effect scattering (Raman); and nuclear magnetic resonance (NMR). An example of a process FTIR spectrometer is commercially available from (Applied Instrument Technologies, Inc., Upland, California.) Commercially available examples of the various NIR spectrometer technologies include the QuasIR 2000 FTNIR (Galaxy Scientific, Nashua, New Hampshire); the PIONIR (Applied Instrument Technologies, Inc.); and the Verax VPA (JP3 Measurement LLC, Austin, TX). Examples of Raman spectrometers include the HyperFlux P.R.O. Plus (Tornado Spectral Systems, Toronto, Ontario) and the PI-200 (Process Instruments, Inc., Salt Lake City, Utah). The MOD-800 MRA (Modcon Systems Ltd., London, England) is an example of an NMR spectrometer.

In alternate embodiments, the property analyzer 46 may include one or more univariate property sensors and/or a gas chromatograph (GC). An example of a GC suitable for use in these embodiments is the GC8000 by Yokogawa Electric Corporation (Tokyo, Japan).

This use of property analyzer 46 helps ensure that the waste material is consistent with the waste profile (WCC) predicted by system 20, and helps to confirm that the received material does not contain any restricted substances. In particular embodiments, the results of testing 46 are transmitted to system 20, as shown at 47. If these results are non-compliant with the predicted WCC generated by system 20, as defined by more than a predetermined variance (e.g., 5 percent) between the WCC and the output of the property analyzer 46, then system 20 uses the results to re-execute steps 24-34, to generated a Revised WCC for customer approval. Alternatively, if the results are compliant/within the predetermined variance, then system 20 may send operational directives at 37 to repeat various ones of the aforementioned steps to collect and transport the waste to the waste receiving location for disposal.

It should be recognized that in the event all of the customer's waste was collected at the first execution of step 39, then upon a determination of compliance by analyzer 46, then relatively few steps (e.g., only steps 42 and 44) may need to be re-executed. Alternatively, in the event that only a sample of the customer's waste was collected at the first execution of step 39, then upon a determination of compliance by analyzer 46, steps 39-44 may be re-executed to collect and transport the remainder of the customer's waste for disposal, as indicated at step 48. It should also be recognized that the waste receiving location at which testing occurred using analyzer 46 may not be the same waste receiving location at which the waste is to be disposed. Still further, it should be recognized that a plurality of waste receiving locations may be used to optimally dispose of all of the customer's waste.

In particular embodiments, system 20 maintains the data and documentation generated by this process for a predetermined time, e.g., up to seven years.

Embodiments of the present invention thus automatically perform the following steps:
 1. Data Validation.
 2. Review of material specifications corresponding to the data.
 3. Waste Class Code determination.
 4. Identifying various restrictions.
 5. Disposal Facility selection.
 6. Generation of Land Disposal Restrictions.
 7. Hazard Identification/Communication.

As will be discussed in greater detail hereinbelow, system 20 leverages AI to automatically review the data submitted by the customer, review past history of waste profiles associated with that customer, and compare that information with similar types of waste profiles for other customers. In doing so, system 20 identifies consistent patterns of behavior exhibited by various categories of chemicals when they are mixed with each other into a homogenous mix of waste products from an industrial process. As discussed, a step in this process is the identification of the Waste Class code (WCC). The WCC represents the aggregate behavior of the waste (waste profile), which is used to determine how the waste will be processed. Each WCC has a detailed specification that identifies and defines the various behaviors. The table of FIG. 2 includes representative examples of Waste Class Codes. The table of FIG. 3 includes representative examples of relationships between various WCCs and disposal methods. The table of FIG. 4 provides some representative examples of physical properties that are captured for a typical waste profile used to generate a WCC, and FIG. 5 includes a representative set of chemical constituents associated with a waste profile/WCC.

It should be recognized that the various types of properties/data fields of a waste profile shown and described herein are merely exemplary and represent but a small subset of the type of properties that may be captured and/or generated for a waste profile/WCC in accordance with the present invention.

An aspect of the present invention is the recognition by the instant inventors that conventional processes for generation of WCCs are time consuming and reliant on various cumbersome approaches. There is an overt reliance on tribal knowledge—a technician typically takes up to a year to get ready to approve waste profiles. Over a period of 2-3 years they gain proficiency and move to a slightly more leadership role after about 5-6 years. When personnel are lost due to attrition, training a new tech and getting them up to speed takes significant effort and remaining personnel tend to be over-burdened in the meantime. Moreover, the amount of knowledge that is lost to attrition cannot be easily replaced. Attempts to overstaff to help mitigate these effects generally leads to increased costs.

The embodiments shown and described herein use sophisticated devices including specialized property analyzers such as spectrometers, ecommerce platforms, and machine learning, in connection with sophisticated collection and transportation devices, to address these drawbacks.

A.I/Machine Learning

As used herein, the term Machine Learning (ML) is a category of artificial intelligence that describes a computer's ability to train on a set of data and then create rules or knowledge from that data. In an ML system, historical data is analyzed. Key data attributes that are pertinent to a given problem area are identified. It does so by crunching vast quantities of data and detecting patterns in the data that suit future use cases. System 20 thus uses ML to predict the Waste Class Code of a given waste profile, based on Applicant's vast database of waste profiles and chemical substances, accumulated over the past 40 years of operations, to automate the waste profile approval process. As new data becomes available, the ML model of system 20 is retrained with updated data sets.

ML Implementation to automate Waste Class Code prediction Various embodiments of the present invention generate waste profiles having at least 74 different data columns. Each data column can hold on an average 4-5 data elements. Each combination of these data elements can vary the behavior of a chemical substance in multiple ways. System 20, using ML, analyzes various chemical compositions and interplay of various attributes with each one another, to quickly predict with high levels accuracy, the Waste Class Code of that waste profile, effectively in real time.

Referring to FIG. 6, in particular embodiments, the ML of system 20 uses an algorithm called Random Forest, a simplified version of which is shown at 50. Random Forest works by creating multiple decision trees 52 (Tree-1, Tree-2, Tree-n) during training, and outputting the average prediction 54 of each tree (Class-A, Class-B, Class-n). Each decision tree (DT) is an inverted tree that is built up of attributes that take part in deciding the type of chemical substance that is to be classified. The attributes of this tree include, e.g., the various data elements mentioned in FIGS. 4 and 5. Each DT in a Random Forest votes to decide which outcome it prefers. The Random Forest algorithm 50 then averages this output of various trees (majority voting) and provides the outcome Waste Class Code (Final Class) 56 as a prediction.

Figure 7:
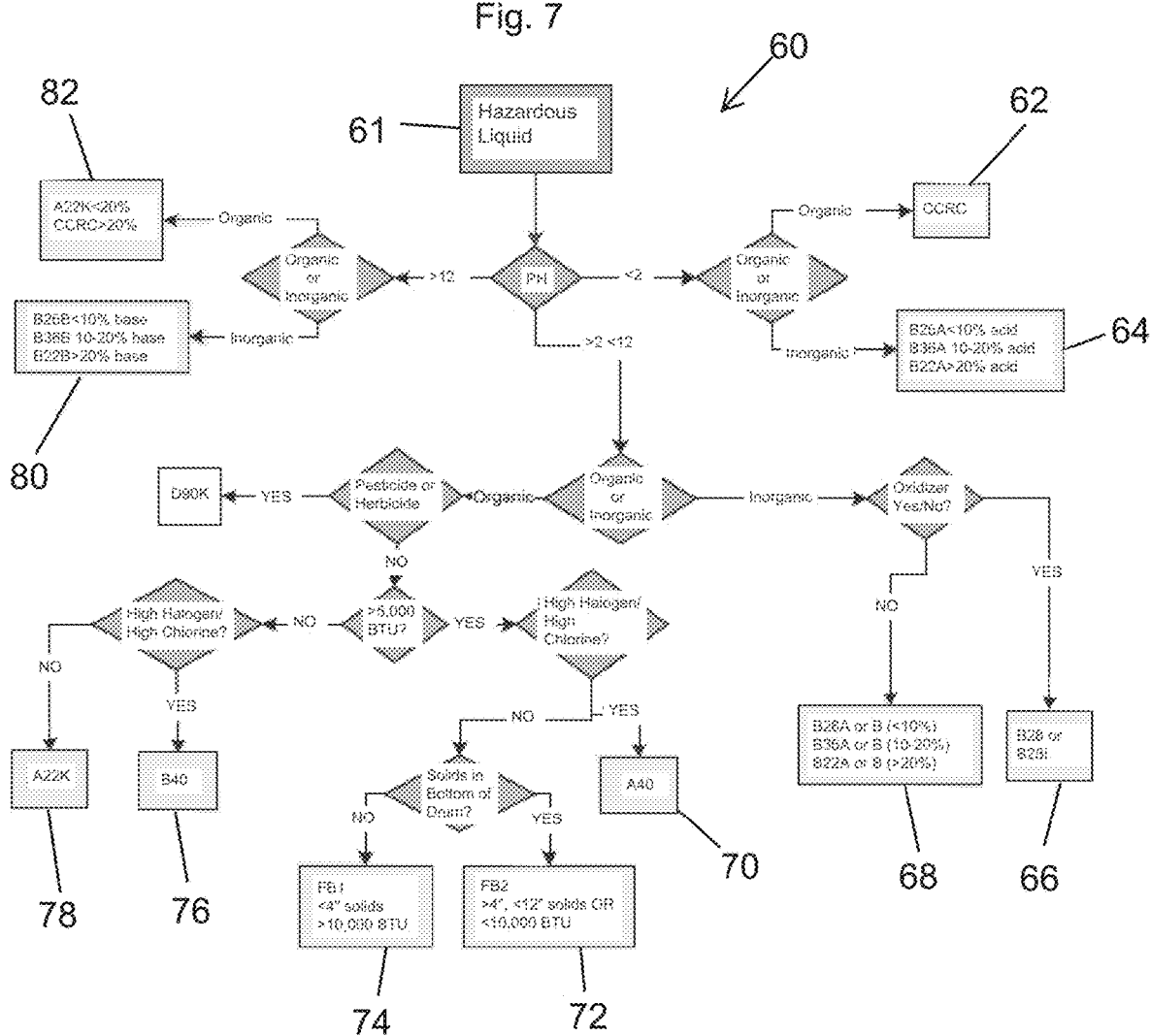
FIG. 7 is a flow chart illustrating aspects of the embodiments of FIGS. 1-6.

Turning now to FIG. 7, a representative ML model 60 that incorporates this WCC prediction, and which may be used in various embodiments of the present invention, is shown and described. When ML model 60 is asked to predict a WCC 56 (FIG. 6), it receives input data at 61. At the leaves of this decision tree, are the various outcomes, which are the predicted Waste Class Codes (WCCs) 62-82. In this manner, the AI data processor/platform 21 (FIG. 1) effectively compares the profile data supplied by the customer at 22 (FIG. 1), to a corpus of WCC data stored by system 20, e.g., using platform 21, to generate the predicted WCC at 26 (FIG. 1). If the data points to one of the WCCs, then that WCC is stamped/assigned to the input waste profile. In particular embodiments, system 20, e.g., including ML model 60, is implemented using an A.I. platform 21 in the form of the Azure Machine Learning Platform provided by Microsoft's Cognitive Microsoft Services Framework (Microsoft, Inc., Redmond WA). This platform provides a rich catalog of algorithms and other capabilities in Natural Language processing to implement any number of A.I./ML systems.

In these embodiments, Azure is communicably coupled via network (e.g., internet) 23 to ecommerce platform 25. Examples of ecommerce platforms that may be used in embodiments of the present invention include the Clean Harbors WIN (Waste Information Network) IT platform available from Clean Harbors, Inc. (Norwell, MA), and/or the Shopify™ platform (Shopify Inc., Ottawa, ON Canada). Particular embodiments may use a combination of the WIN IT and Shopify platforms.

Figure 8:
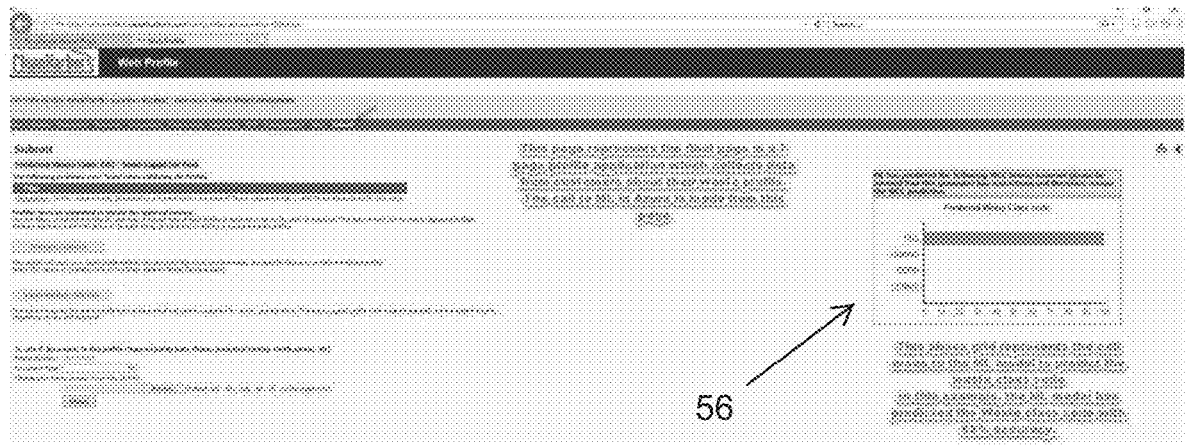
FIG. 8 is an illustration of a user interface display generated by the embodiments of FIGS. 1-7.

Turning now to FIG. 8, a representative screen shot is shown of a waste profile application run and displayed by the ecommerce platform 25. In this embodiment, the waste profile application in Applicant is a 7-page app that effectively serves as the portal by which a user enters/uploads the details of the profile at 22 (FIG. 1). In the final page, e.g., once all of the requested information has been entered, the application makes a call to the ML model in Azure, which in this example, generates a predicted WCC at 56, with almost 98% accuracy.

It should be noted that in particular embodiments, the system and methodology shown and described herein, including the waste profile application accessed by users to upload data at 22 (FIG. 1) may be hosted in the cloud/online. Customers would thus be able to log into the system via platform 25 and upload their data and get a prediction of what that data represents in terms of chemistry. Those skilled in the art should recognize, however, that aspects of the embodiments shown and described herein may be implemented as off-line/stand-alone systems without departing from the scope of the present invention. Moreover, although the foregoing embodiments are shown and described with respect to hazardous waste, the skilled artisan should recognize that aspects of these embodiments may be applied to non-hazardous waste without departing from the scope of the present invention.

Figure 9:
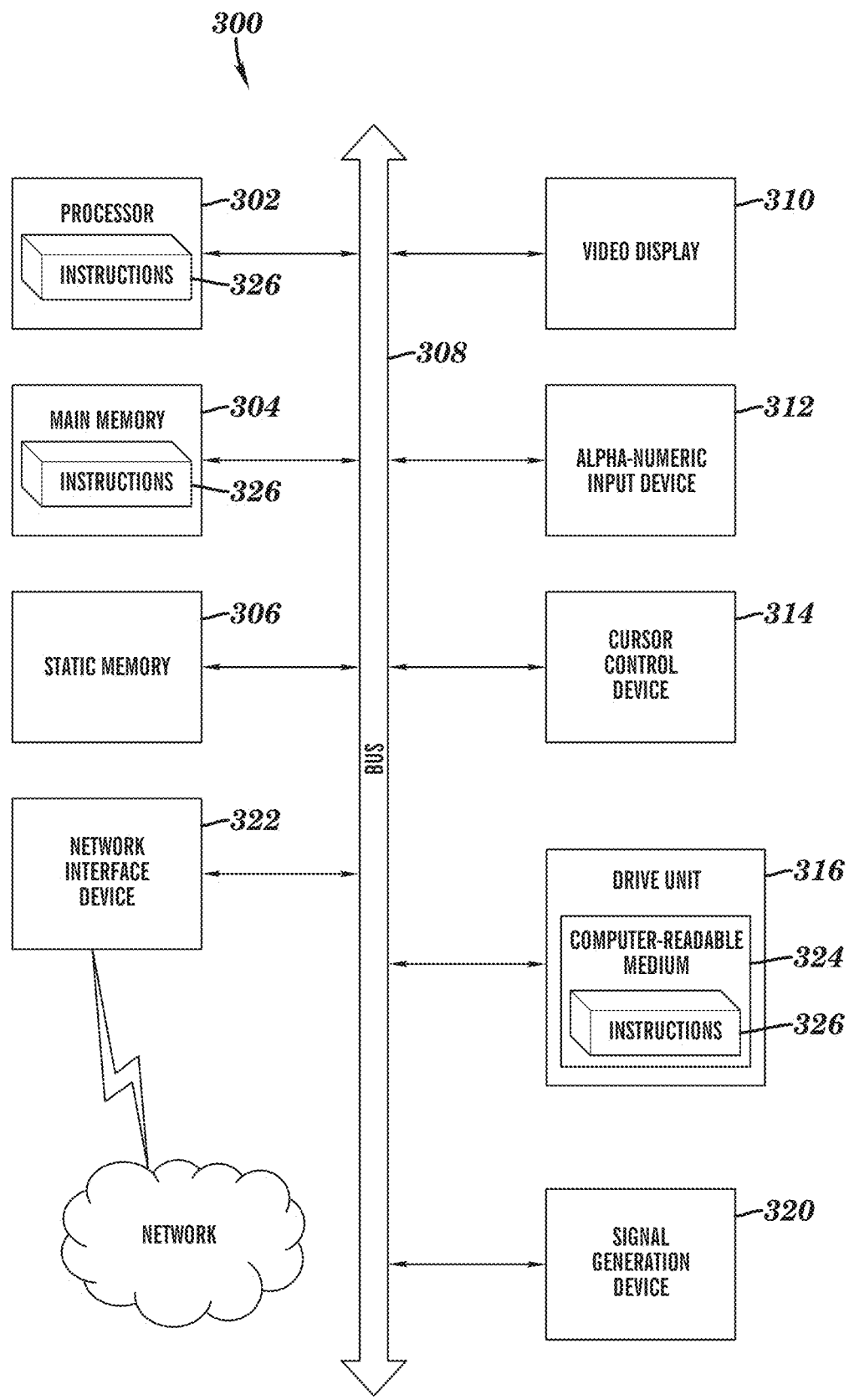
FIG. 9 is a block diagram of one embodiment of a computer system usable to implement various aspects of the embodiments of FIGS. 1-8.

FIG. 9 shows a diagrammatic representation of a machine in the exemplary form of a computer system 300 within which a set of instructions, for causing the machine to perform any one of the methodologies discussed above, may be executed. In alternative embodiments, the machine may include a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD), plasma, cathode ray tube (CRT), etc.). The computer system 300 may also include an alpha-numeric input device 312 (e.g., a keyboard or touchscreen), a cursor control device 314 (e.g., a mouse), a drive (e.g., disk, flash memory, etc.,) unit 316, a signal generation device 320 (e.g., a speaker) and a network interface device 322.

The drive unit 316 includes a computer-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 322. For the purposes of this specification, the term "computer-readable medium" shall be taken to include any medium that is capable of storing or encoding a sequence of instructions for execution by the computer and that cause the computer to perform any one of the methodologies of the present invention, and as further described hereinbelow.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems. Moreover, the particular naming of the components, capitalization of terms, the attributes, data structures, or any other programming or structural aspect is not mandatory or significant, and the mechanisms that implement the invention or its features may have different names, formats, or protocols.

Moreover, unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Embodiments of the present invention also relate to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible, non-transitory, computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), any other appropriate static, dynamic, or volatile memory or data storage devices, or other type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. It should be further understood that any of the features described with respect to one of the embodiments described herein may be similarly applied to any of the other embodiments described herein without departing from the scope of the present invention. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims. It should be further understood that any of the features described with respect to one of the embodiments described herein may be similarly applied to any of the other embodiments described herein without departing from the scope of the present invention.

Having thus described the invention, what is claimed is:

1. An automated apparatus for classifying and managing the transport of hazardous waste, the apparatus comprising:
   at least one specialized hazardous waste collection and transportation device (CTD) configured for collecting and transporting hazardous waste to a receiving facility;
   at least one specialized property analyzer configured to analyze the hazardous waste, and to generate an output corresponding to physical characteristics of the hazardous waste;
   a classification and control system communicably coupled to the specialized property analyzer and to the CTD;
   the control system having a memory and a processor, wherein the memory includes a stored program executable by the processor;

a specialized ecommerce platform communicably coupled to the classification and control system, the ecommerce platform configured to electronically receive from customers, waste management requests, waste profile data, and waste pickup locations;

an artificial intelligence (AI) data processor communicably coupled to the classification and control system;

the classification and control system configured to capture from the ecommerce platform, waste management requests, waste profile data, and waste pickup locations; and the stored program of the classification and control system configured to:
(a) capture from the ecommerce platform, the waste management requests, waste profile data, and waste pickup locations;
(b) enter the waste profile data into the AI data processor;
(c) cause the AI data processor to use the waste profile data to generate a predicted waste class code (WCC) for the waste;
(d) use the WCC to generate land disposal restrictions (LDRs) for the waste;
(e) use the WCC to determine an optimal one of a plurality of predetermined waste receiving locations for analysis and/or disposal of the waste;
(f) use the WCC and optimal one of a plurality of predetermined waste receiving locations, to generate and send operational directives to the CTD for collecting and transporting at least a sample of the waste for analysis;
(g) cause the specialized property analyzer to generate an analysis of physical properties of the sample of the waste, and to capture the analysis;
(h) compare the analysis with the WCC to confirm compliance with the WCC and, if non-compliant, transmit the analysis to the AI data processor and cause the AI data processor to repeat said (a)-(g);
(i) use the WCC and optimal one of a plurality of predetermined waste receiving locations, to generate and send operational directives to the CTD for collecting and transporting the waste for disposal.

2. The apparatus of claim 1, wherein the at least one specialized property analyzer comprises a spectrometer.

3. The apparatus of claim 1, wherein the AI data processor is configured to compare the profile data to a corpus of stored WCC data to generate the WCC.

4. The apparatus of claim 1, wherein said capture (a) is further configured to determine whether sufficient data has been captured from the ecommerce platform for generation of the WCC, or whether additional data is required.

5. The apparatus of claim 4, wherein:
the stored program is further configured to:
approve a waste collection request;
generate documentation including the WCC, the LDRs and the optimal one of a plurality of predetermined waste receiving locations; and
transmit the documentation to the customers via the ecommerce platform.

6. The apparatus of claim 1, wherein said use (e) further comprises generating the optimal one of a plurality of predetermined waste receiving locations based on cost.

7. The apparatus of claim 1, wherein the CTD comprises a vacuum truck and/or trailer configured to vacuum wet and/or dry hazardous waste into an on-board tank for transport to the waste receiving location.

8. The apparatus of claim 1, wherein the classification and control system is communicably coupled to the CTD by one or more cellular and/or GPS networks.

9. The apparatus of claim 1, wherein said (f) comprises:
(f) upon receipt of customer authorization, use the WCC and optimal one of a plurality of predetermined waste receiving locations, to generate and send operational directives to the CTD for collecting and transporting at least a sample of the waste for analysis.

10. A method for automatically classifying and managing the transport of hazardous waste, the method comprising:
providing at least one specialized hazardous waste collection and transportation device (CTD) configured for collecting and transporting hazardous waste to a receiving facility;
configuring at least one specialized property analyzer to analyze the hazardous waste, and to generate an output corresponding to physical characteristics of the hazardous waste;
communicably coupling a classification and control system to the specialized property analyzer and to the CTD, the control system having a memory and a processor, wherein the memory includes a stored program executable by the processor;
communicably coupling a specialized ecommerce platform to the classification and control system, the ecommerce platform configured to electronically receive from customers, waste management requests, waste profile data, and waste pickup locations;
communicably coupling an artificial intelligence (AI) data processor to the classification and control system;
configuring the classification and control system to capture from the ecommerce platform, waste management requests, waste profile data, and waste pickup locations; and
with the stored program of the classification and control system:
(a) capturing from the ecommerce platform, the waste management requests, waste profile data, and waste pickup locations;
(b) entering the waste profile data into the AI data processor;
(c) causing the AI data processor to use the waste profile data to generate a predicted waste class code (WCC) for the waste;
(d) using the WCC to generate land disposal restrictions (LDRs) for the waste;
(e) using the WCC to generate an optimal one of a plurality of predetermined waste receiving locations for analysis and/or disposal of the waste;
(f) using the WCC and optimal one of a plurality of predetermined waste receiving locations, to generate and send operational directives to the CTD for collecting and transporting at least a sample of the waste to the waste for analysis;
(g) causing the specialized property analyzer to generate an analysis of physical properties of the sample of the waste, and to capture the analysis;
(h) comparing the analysis with the WCC to confirm compliance with the WCC and, if non-compliant, transmitting the analysis to the AI data processor and causing the AI data processor to repeat said (a)-(g);
(i) using the WCC and optimal one of a plurality of predetermined waste receiving locations, to generate and send operational directives to the CTD for collecting and transporting the waste to the waste receiving location for disposal.

11. The method of claim 10, further comprising, with the AI data processor, comparing the profile data to a corpus of stored WCC data to generate the WCC.

12. The method of claim 10, wherein said capturing (a) further comprises determining whether sufficient data has been captured from the ecommerce platform for generation of the WCC, or whether additional data is required.

13. The method of claim 12, further comprising, with the stored program:
approving a waste collection request;
generating documentation including the WCC, the LDRs and the optimal one of a plurality of predetermined waste receiving locations; and
transmitting the documentation to the customers via the ecommerce platform.

14. The method of claim 10, wherein said using (e) further comprises generating the optimal one of a plurality of predetermined waste receiving locations based on cost.

15. The method of claim 10, wherein the CTD comprises a vacuum truck and/or trailer configured to vacuum wet and/or dry hazardous waste into an on-board tank for transport to the waste receiving location.

16. The method of claim 10, wherein the classification and control system is communicably coupled to the CTD by one or more cellular and/or GPS networks.

17. The method of claim 10, wherein the at least one specialized property analyzer comprises a spectrometer.

18. The method of claim 10, wherein said (f) comprises:
(f) upon receipt of customer authorization, use the WCC and optimal one of a plurality of predetermined waste receiving locations, to generate and send operational directives to the CTD for collecting and transporting at least a sample of the waste for analysis.

19. An article of manufacture comprising a non-transitory program storage medium readable by a computer, the medium tangibly embodying one or more programs of instructions executable by the computer to perform a method for automatically classifying and managing the transport of hazardous waste, the article of manufacture comprising:
a stored program configured to:
(a) capture from an ecommerce platform, waste management requests, waste profile data, and waste pickup locations;
(b) enter the waste profile data into an AI data processor;
(c) cause the AI data processor to use the waste profile data to generate a predicted waste class code (WCC) for the waste;
(d) use the WCC to generate land disposal restrictions (LDRs) for the waste;
(e) use the WCC to determine an optimal one of a plurality of predetermined waste receiving locations for analysis and/or disposal of the waste;
(f) use the WCC and optimal one of a plurality of predetermined waste receiving locations, to generate and send operational directives to a specialized hazardous waste collection and transportation device (CTD) for collecting and transporting at least a sample of the waste to a waste receiving location for analysis;
(g) cause a specialized property analyzer to generate an analysis of physical properties of the sample of the waste, and to capture the analysis;
(h) compare the analysis with the WCC to confirm compliance with the WCC and, if non-compliant, transmit the analysis to the AI data processor and cause the AI data processor to repeat said (a)-(g);
(i) use the WCC and optimal one of a plurality of predetermined waste receiving locations, to generate and send operational directives to the CTD for collecting and transporting the waste for disposal.

20. The article of manufacture of claim 19, wherein:
said capture (a) is further configured to determine whether sufficient data has been captured from the ecommerce platform for generation of the WCC, or whether additional data is required.

21. The article of manufacture of claim 20, wherein:
the stored program is further configured to:
approve a waste collection request;
generate documentation including the WCC, the LDRs and the optimal route; and
transmit the documentation to the customers via the ecommerce platform.

22. The article of manufacture of claim 19, wherein said use (e) further comprises generating the optimal route based on cost.

* * * * *